United States Patent
Hashizume

(10) Patent No.: US 9,912,879 B2
(45) Date of Patent: Mar. 6, 2018

(54) EMBEDDING TAG INFORMATION TO IMAGE DATA OF A MOVING IMAGE

(71) Applicant: SONY CORPORATION, Tokyo (JP)

(72) Inventor: Jun Hashizume, Tokyo (JP)

(73) Assignee: SONY CORPORATION, Toyko (JP)

( * ) Notice: Subject to any disclaimer, the term of this patent is extended or adjusted under 35 U.S.C. 154(b) by 0 days.

(21) Appl. No.: 15/126,670

(22) PCT Filed: Mar. 13, 2015

(86) PCT No.: PCT/JP2015/057530
§ 371 (c)(1),
(2) Date: Sep. 16, 2016

(87) PCT Pub. No.: WO2015/146644
PCT Pub. Date: Oct. 1, 2015

(65) Prior Publication Data
US 2017/0094191 A1  Mar. 30, 2017

(30) Foreign Application Priority Data

Mar. 26, 2014 (JP) .................................. 2014-064009

(51) Int. Cl.
*H04N 5/265* (2006.01)
*H04N 5/343* (2011.01)
(Continued)

(52) U.S. Cl.
CPC ......... *H04N 5/265* (2013.01); *H04N 1/32128* (2013.01); *H04N 5/23245* (2013.01); *H04N 5/343* (2013.01); *H04N 5/345* (2013.01)

(58) Field of Classification Search
CPC .... H04N 5/232; H04N 5/23245; H04N 5/265; H04N 5/238; H04N 5/772; H04N 5/765;
(Continued)

(56) References Cited

U.S. PATENT DOCUMENTS 6,833,865 B1*  12/2004  Fuller ............... G06F 17/30247
                                                       348/231.2
7,403,224 B2*   7/2008  Fuller ............... G06F 17/30247
                                                       348/231.3
(Continued)

FOREIGN PATENT DOCUMENTS

CN  101647269 A   2/2010
CN  102547127 A   7/2012
(Continued)

OTHER PUBLICATIONS

International Search Report and Written Opinion of PCT Application No. PCT/JP2015/057530, dated Jun. 16, 2015, 8 pages of English Translation and 7 pages of ISRWO.
(Continued)

*Primary Examiner* — Michael Osinski
(74) *Attorney, Agent, or Firm* — Chip Law Group

(57) ABSTRACT

The present disclosure relates to an image sensor and an electronic device capable of outputting image data corresponding to frames of a moving image in such a manner that the image data can be reconstructed in temporal order. An image sensor according to a first aspect of the present disclosure includes: a pixel unit configured to generate a pixel signal in response to incident light; an image generating unit configured to generate image data corresponding to frames of a moving image on the basis of the generated pixel signal; a tag information generating unit configured to generate tag information to be embedded into the generated image data; an output unit configured to output the image data having the tag information embedded therein through at least one of first and second logical channels; and a control unit configured to control the pixel unit, the image generating unit, the tag information generating unit, and the output unit to operate in a Slow Movie mode or in a Super
(Continued)

Slow Movie mode. The present disclosure is applicable to an electronic device having an imaging function.

8 Claims, 9 Drawing Sheets

(51) Int. Cl.
  *H04N 5/345* (2011.01)
  *H04N 5/232* (2006.01)
  *H04N 1/32* (2006.01)

(58) Field of Classification Search
  CPC .... H04N 5/23229; H04N 5/343; H04N 5/345; H04N 5/783; H04N 1/32128; H04N 2201/3214; H04N 2201/3215; H04N 2201/3225; H04N 2201/3226; H04N 2201/3232; H04N 2201/3252; H04N 2201/3253; G08B 13/19671
  See application file for complete search history.

(56) References Cited

U.S. PATENT DOCUMENTS

| | | | | |
|---|---|---|---|---|
| 7,432,983 B2* | 10/2008 | Masukura | H04N 7/16 | 345/620 |
| 7,623,176 B2* | 11/2009 | Hoshino | G11B 27/11 | 348/231.3 |
| 7,920,775 B2* | 4/2011 | Tagawa | H04N 5/783 | 386/328 |
| 8,094,991 B2* | 1/2012 | Taoka | H04N 5/772 | 386/201 |
| 8,154,606 B2* | 4/2012 | Tokuyama | G07F 17/32 | 348/208.16 |
| 8,405,770 B2* | 3/2013 | White | | 348/452 |
| 8,811,802 B2* | 8/2014 | Black | H04N 9/8205 | 386/284 |
| 9,013,604 B2* | 4/2015 | Karn | H04N 5/23219 | 348/208.14 |
| 9,167,164 B2* | 10/2015 | Baek | G11B 27/3027 | |
| 9,502,072 B2* | 11/2016 | Miyahara | G11B 27/005 | |
| 9,525,827 B2* | 12/2016 | Takahashi | H04N 5/2621 | |
| 9,681,111 B1* | 6/2017 | Newman | H04N 9/8205 | |
| 2004/0130637 A1* | 7/2004 | Kake | G06T 3/0093 | 348/239 |
| 2005/0052553 A1* | 3/2005 | Kido | H04N 3/1562 | 348/296 |
| 2005/0157184 A1* | 7/2005 | Nakanishi | H04N 5/23245 | 348/220.1 |
| 2005/0163492 A1* | 7/2005 | Ueda | H04N 5/783 | 386/228 |
| 2006/0050883 A1* | 3/2006 | Walker | H04N 7/1675 | 380/239 |
| 2006/0061667 A1* | 3/2006 | Tunoda | H04N 1/00307 | 348/222.1 |
| 2006/0238620 A1* | 10/2006 | Asada | H04N 5/232 | 348/207.99 |
| 2007/0013808 A1* | 1/2007 | Tagawa | H04N 5/783 | 348/362 |
| 2008/0024610 A1* | 1/2008 | Konishi | G08B 13/19652 | 348/159 |
| 2008/0024611 A1* | 1/2008 | Konishi | G01S 3/786 | 348/180 |
| 2008/0118226 A1* | 5/2008 | Kim | G11B 27/034 | 386/330 |
| 2009/0046175 A1* | 2/2009 | Ozawa | H04N 5/772 | 348/231.99 |
| 2009/0115866 A1* | 5/2009 | Niida | H04N 5/232 | 348/222.1 |
| 2009/0154895 A1* | 6/2009 | Taoka | H04N 5/772 | 386/239 |
| 2009/0195675 A1* | 8/2009 | Haneda | H04N 5/232 | 348/240.99 |
| 2010/0079620 A1* | 4/2010 | Kuriyama | H04N 5/232 | 348/231.3 |
| 2010/0214439 A1 | 8/2010 | Oshima et al. | | |
| 2010/0260472 A1* | 10/2010 | Okada | H04N 5/772 | 386/343 |
| 2010/0295970 A1* | 11/2010 | Suzuki | H04N 5/232 | 348/240.3 |
| 2011/0293244 A1* | 12/2011 | Kuriyama | H04N 5/23245 | 386/248 |
| 2012/0057843 A1* | 3/2012 | Otani | G11B 27/005 | 386/224 |
| 2012/0120289 A1* | 5/2012 | Sugioka | G06T 1/0007 | 348/294 |
| 2012/0154609 A1* | 6/2012 | Ozaki | H04N 5/765 | 348/207.99 |
| 2013/0136413 A1* | 5/2013 | Mizuno | H04N 5/783 | 386/230 |
| 2013/0195183 A1* | 8/2013 | Zhai | H04N 19/00569 | 375/240.12 |
| 2013/0222640 A1* | 8/2013 | Baek | G11B 27/3027 | 348/231.99 |
| 2014/0095744 A1* | 4/2014 | Yoshida | G06F 5/14 | 710/53 |
| 2014/0099025 A1* | 4/2014 | Suzuki | H04N 19/597 | 382/166 |
| 2014/0104460 A1* | 4/2014 | Tanaka | H04N 5/23296 | 348/240.2 |
| 2014/0186006 A1* | 7/2014 | Jin | H04N 5/783 | 386/230 |
| 2015/0049217 A1* | 2/2015 | Takahashi | H04N 5/2621 | 348/231.99 |
| 2015/0187390 A1* | 7/2015 | Pacurariu | H04N 5/772 | 386/227 |
| 2015/0189118 A1* | 7/2015 | Ogata | H04N 1/32101 | 348/231.3 |
| 2016/0072999 A1* | 3/2016 | Miyasako | H04N 5/2329 | 348/208.6 |

FOREIGN PATENT DOCUMENTS

| | | |
|---|---|---|
| EP | 2173088 A1 | 4/2010 |
| JP | 2007-5869 A | 1/2007 |
| JP | 2013-85279 A | 5/2013 |
| WO | 2009/013907 A1 | 1/2009 |

OTHER PUBLICATIONS

International Preliminary Report on Patentability of PCT Application No. PCT/JP2015/057530, dated Sep. 27, 2016, 6 pages.

* cited by examiner

EMBEDDING TAG INFORMATION TO IMAGE DATA OF A MOVING IMAGE

CROSS REFERENCE TO RELATED APPLICATIONS

This application is a U.S. National Phase of International Patent Application No. PCT/JP2015/057530 filed on Mar. 13, 2015, which claims priority benefit of Japanese Patent Application No. 2014-064009 filed in the Japan Patent Office on Mar. 26, 2014. Each of the above-referenced applications is hereby incorporated herein by reference in its entirety.

TECHNICAL FIELD

The present disclosure relates to an image sensor and an electronic device, and more particularly, to an image sensor and an electronic device configured to embed tag information into image data of a taken moving image when the image data are output through a plurality of logical channels, the tag information allowing the image data to be arranged in temporal order (in the order in which the image data are taken) at a subsequent device.

BACKGROUND ART

There have been image sensors capable of imaging at a high frame rate (several to tens of times of a normal frame rate) in addition to imaging at the normal frame rate (30 fps, for example) (refer to Patent Document 1, for example).

Such an image sensor is configured to store image data (hereinafter also referred to as frames) obtained at a high frame rate into a ring buffer, while thinning and reading the frames at a normal frame rate from the ring buffer and outputting the read frames during high frame rate imaging, and to read and output all the frames stored in the ring buffer after termination of the high frame rate imaging.

In a case where image data obtained through high frame rate imaging are output separately during imaging and after termination of the imaging as described above, the order in which the image data are output is different from the temporal order, and therefore these image data need to be reconstructed in temporal order for use in a device to which the image data are output.

CITATION LIST

Patent Document

Patent Document 1: Japanese Patent Application Laid-Open No. 2010-183558

SUMMARY OF THE INVENTION

Problems to be Solved by the Invention

For arrangement of frames of a moving image in temporal order (imaging order, reproduction order, or the like), a method of recording a time stamp in a header of each frame is typically known. This method is, however, difficult to be used in image sensors since the header size becomes large.

The present disclosure is achieved in view of the aforementioned circumstances, and enables output of image data corresponding to frames of a moving image in such a manner that the image data can be reconstructed in temporal order.

Solutions to Problems

An image sensor according to a first aspect of the present disclosure includes: a pixel unit configured to generate a pixel signal in response to incident light; an image generating unit configured to generate image data corresponding to frames of a moving image on the basis of the generated pixel signal; a tag information generating unit configured to generate tag information to be embedded into the generated image data; an output unit configured to output the image data having the tag information embedded therein through at least one of first and second logical channels; and a control unit configured to control the pixel unit, the image generating unit, the tag information generating unit, and the output unit to operate in a Slow Movie mode or in a Super Slow Movie mode.

The tag information generating unit can generate, as the tag information, at least one of SLOW_MODE, FRM_RATE_RATIO, SLOW_NUM, FRM_CNT, FRM_CNT_SS, DUPLI_PIC, and SCN_DET.

In the Slow Movie mode, the control unit can output the image data having the tag information embedded therein corresponding to the normal frame rate lower than the high frame rate through the first logical channel at the normal frame rate among the image data generated at the high frame rate, and output the remaining image data having the tag information embedded therein through the second logical channel at the high frame rate.

In the Slow Movie mode, the tag information generating unit can generate, as the tag information, at least FRM_RATE_RATIO and SLOW_NUM.

The image sensor according to the first aspect of the present disclosure can further include a ring buffer to store the generated image data.

In the Super Slow Movie mode, the control unit can store image data generated at the high frame rate into the ring buffer, output the image data read at the normal frame rate lower than the high frame rate from the ring buffer at the normal frame rate through the first logical channel in a state in which the tag information is embedded in the image data, stop storage of the image data generated at the high frame rate into the ring buffer in response to detection of a predetermined scene, output the image data generated at the normal frame rate and having the tag information embedded therein at the normal frame rate through the first logical channel in a state in which storage into the ring buffer is stopped, and after the output through the first logical channel is terminated, read the image data generated at the high frame rate and stored in the ring buffer at a predetermined frame rate and output the read image data through the second logical channel in a state in which the tag information is embedded therein.

In the Super Slow Movie mode, the tag information generating unit can generate, as the tag information, at least FRM_RATE_RATIO and DUPLI_PIC.

An electronic device according to a second aspect of the present disclosure includes an image sensor including: a pixel unit configured to generate a pixel signal in response to incident light; an image generating unit configured to generate image data corresponding to frames of a moving image on the basis of the generated pixel signal; a tag information generating unit configured to generate tag information to be embedded into the generated image data; an output unit configured to output the image data having the tag information embedded therein through at least one of first and second logical channels; and a control unit configured to control the pixel unit, the image generating unit, the tag information generating unit, and the output unit to operate in a Slow Movie mode or in a Super Slow Movie mode.

In the first and second aspects of the present disclosure, a pixel signal is generated in response to incident light, image data corresponding to frames of a moving image are generated on the basis of the generated pixel signal, tag information to be embedded into the generated image data is generated, and image data having the tag information embedded therein are output through at least one of first and second logical channels. Note that the entire image sensor is controlled to operate in a Slow Movie mode or in a Super Slow Movie mode.

Effects of the Invention

According to the first and second aspects of the present disclosure, image data corresponding to frames of a moving image can be output in such a manner that the image data can be reconstructed in temporal order.

MODE FOR CARRYING OUT THE INVENTION

Preferred mode (hereinafter referred to as an embodiment) for carrying out the present disclosure will be described below; however, operation modes of an image sensor will be described before going into the embodiment. Note that the image sensor has two logical channels CH0 and CH1 at an output interface.

<About Slow Movie Mode>

Figure 1:
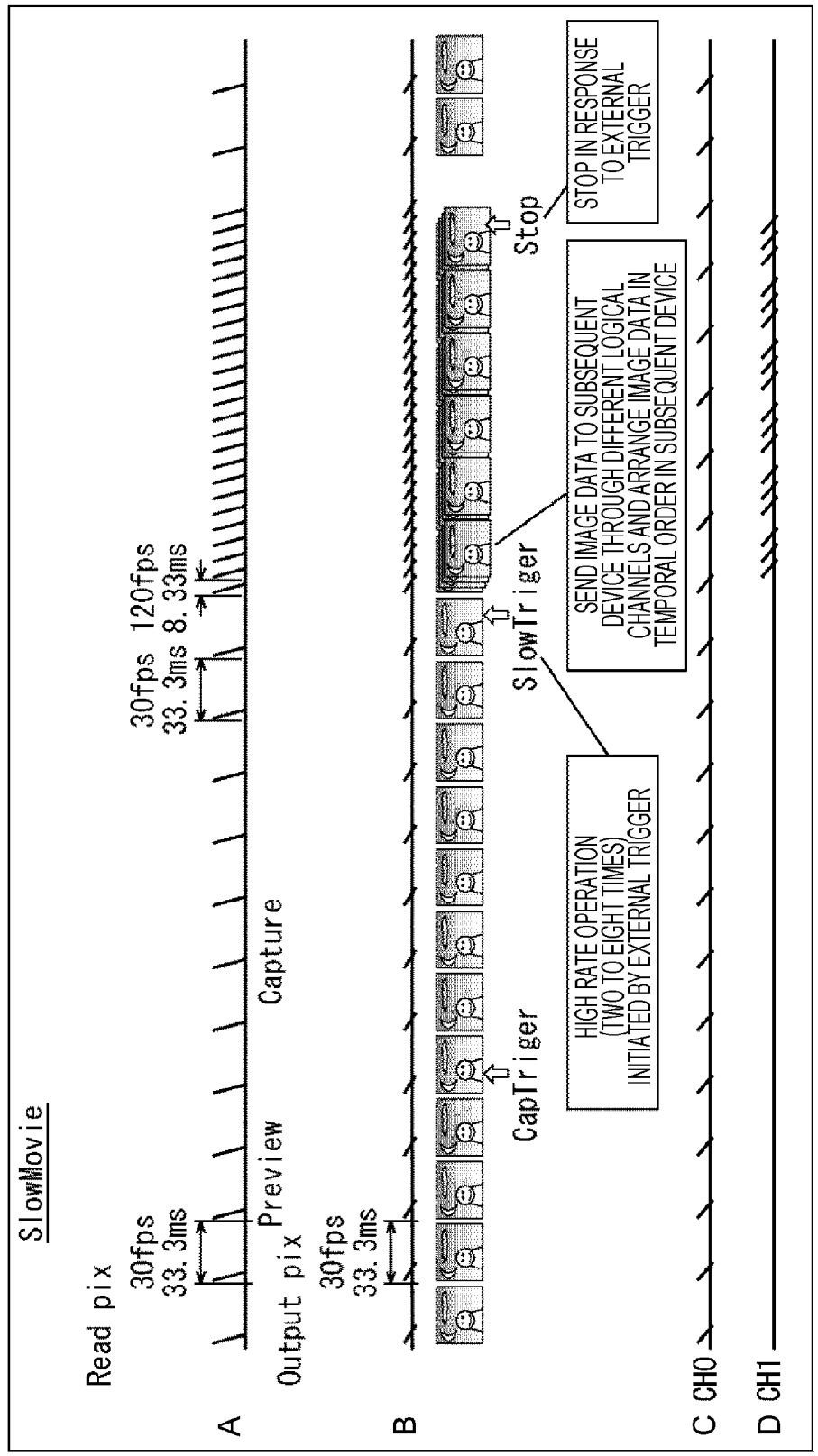
FIG. 1 is a diagram for explaining a Slow Movie mode.

FIG. 1 illustrates a state in a Slow Movie mode, which is one of the operation modes of the image sensor.

The Slow Movie mode is entered from a preview mode via a capture mode.

In the preview mode, image data are generated at a normal frame rate (30 fps, for example), and output as image data for preview display through the logical channel CH0. In the capture mode, image data are generated at the normal frame rate, and output as image data for capture through the logical channel CH0.

In the Slow Movie mode, image data are generated at a frame rate (120 fps, for example) higher than the normal frame rate, thinned by an amount (in this case, ¼) corresponding to image data generated at the normal frame rate among the image data generated at the high frame rate, and output as image data for capture through the logical channel CH0. In addition, at the same time, the remaining data (in this case, ¾) of the image data generated at the high frame rate are output as image data for slow-motion replay through the logical channel CH1.

Thus, in the Slow Movie mode, the image data at the high frame rate are thinned by the normal frame rate and output through the logical channel CH0, and at the same time, the remaining image data are output at the high frame rate through the logical channel CH1.

<About Super Slow Movie Mode>

Figure 2:
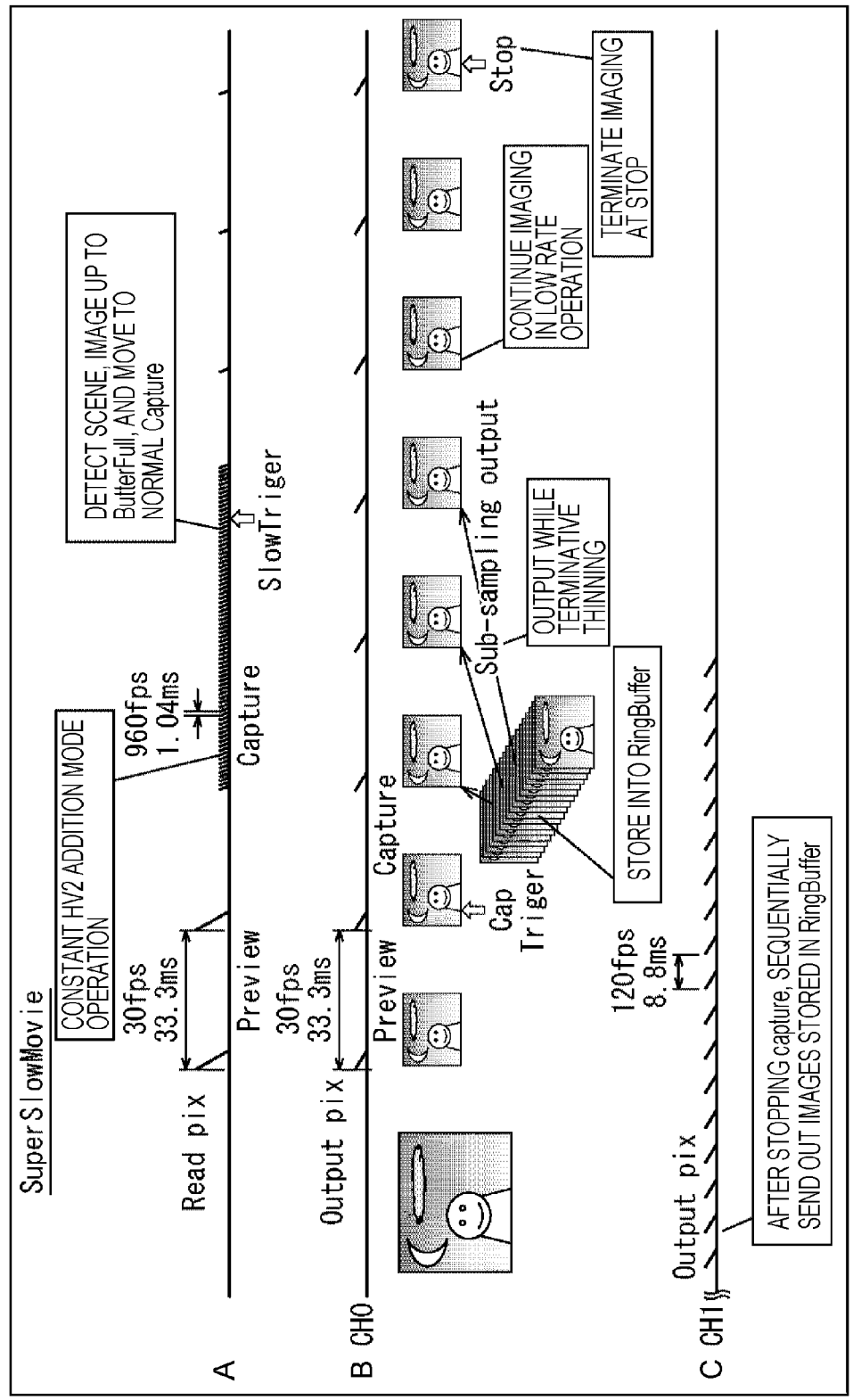
FIG. 2 is a diagram for explaining a Super Slow Movie mode.

FIG. 2 illustrates a state in a Super Slow Movie mode, which is one of the operation modes of the image sensor.

The Super Slow Movie mode (hereinafter also referred to as the Super Slow mode) is entered via the preview mode.

In the Super Slow mode, reduced image data are generated by adding vertical and horizontal 2×2 pixels at a frame rate (960 fps, for example) still higher than the high frame rate, stored in a ring buffer, thinned and read at the normal frame rate from the ring buffer, and output through the logical channel CH0. Note that generation of image data at the still higher frame rate and storage thereof into the ring buffer are stopped in response to detection of a preset scene (for example, a scene in which an object instantaneously changes such as an instant when a balloon pops) from the generated reduced image data (or the image data before reduction). Thereafter, reduced image data are generated at the normal frame rate and output through the logical channel CH0 without being stored in the ring buffer and without any change until the Super Slow mode is terminated. Then, when the Super Slow mode is terminated, the reduced image data before and after the scene detection, which are stored in the ring buffer, are then read at a predetermined frame rate and output through the logical channel CH1. Alternatively, a trigger may be input by a user in place of scene detection.

Thus, during the Super Slow mode, reduced image data are constantly output at the normal frame rate through the logical channel CH0, and after termination of the Super Slow mode, the reduced image data in the ring buffer (including those already output through the logical channel CH0) are output through the logical channel CH1. Alternatively, in the Super Slow mode, image data of a normal size may be constantly output instead of the reduced image data. In addition, the still higher frame rate in the Super Slow mode may be equal to the high frame rate in the Slow Movie mode.

The image sensor of the present embodiment embeds tag information into image data (reduced image data) so that the image data (reduced image data) output through the logical channels CH0 and CH1 in the Slow Movie mode or the Super Slow mode can be reconstructed afterwards in temporal order.

<Example Configuration of Image Sensor of Present Embodiment>

Figure 3:
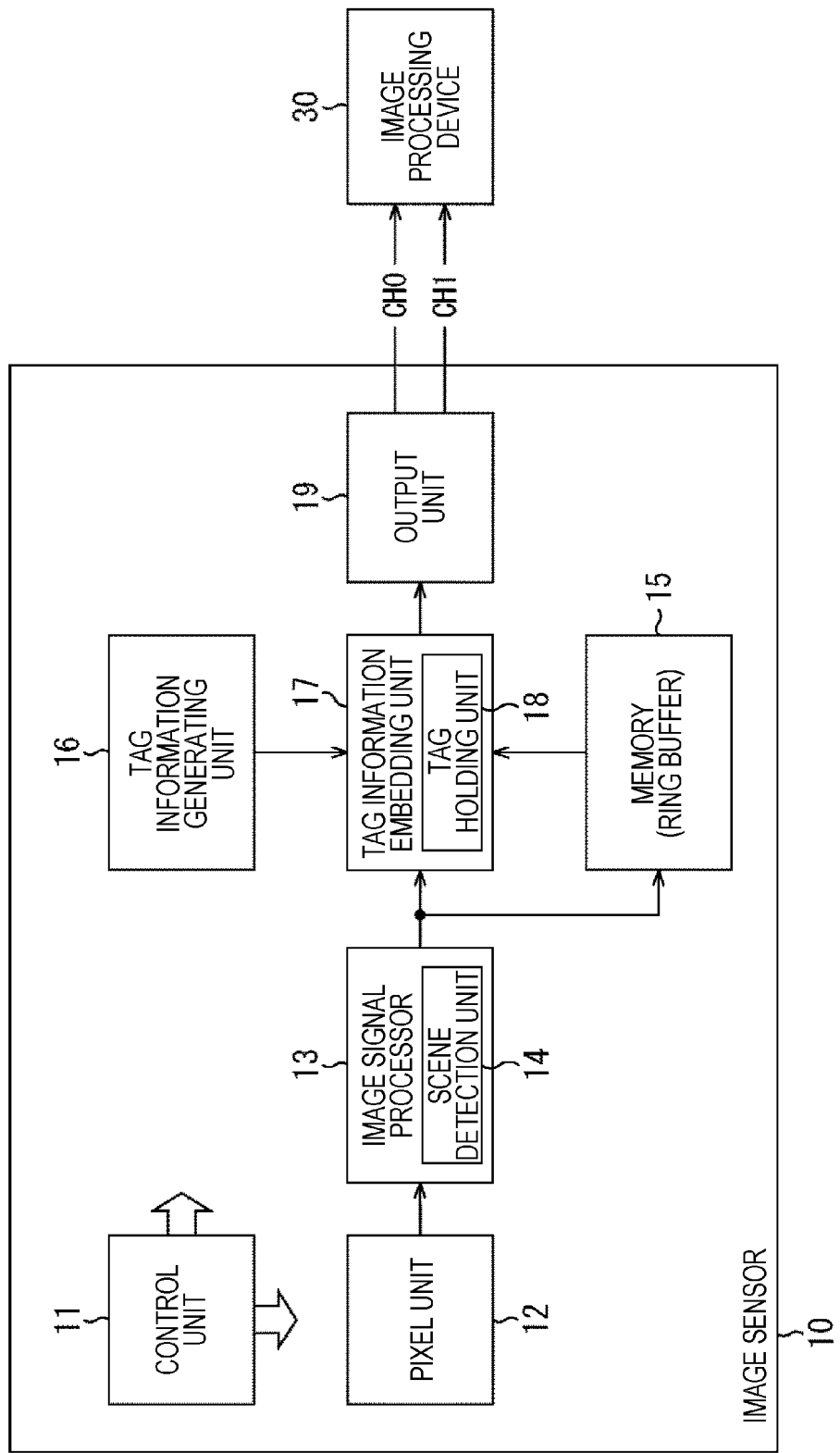
FIG. 3 is a block diagram illustrating an example configuration of an image sensor to which the present disclosure is applied.

FIG. 3 illustrates an example configuration of the image sensor of the present embodiment. The image sensor 10 includes a control unit 11, a pixel unit 12, an image signal processor 13, a memory 15, a tag information generating unit 16, a tag information embedding unit 17, and an output unit 19.

The control unit 11 controls the entire image sensor 10 on the basis of operating mode selecting operations, capture start and end instruction operations, Slow Movie mode start and end operations, and the like input by a user. The pixel unit 12 is constituted by a large number of photodetectors arranged vertically and horizontally, reads pixel signals, which have been generated by the respective photodetectors, at a frame rate depending on the operation mode, and outputs the pixel signals to the image signal processor 13.

The image signal processor 13 generates image data and reduced image data of respective frames on the basis of the pixel signals input from the pixel unit 12. In addition, the image signal processor 13 includes a scene detection unit 14, which detects a preset scene from a plurality of temporally successive frames.

The memory 15 serves as a ring buffer to hold the reduced image data generated by the image signal processor 13 in the Super Slow mode.

The tag information generating unit 16 generates tag information to be embedded into the image data or reduced image data generated by the image signal processor 13. The tag information embedding unit 17 embeds the tag information into the image data, which have been generated by the image signal processor 13, in real time in the Slow Movie mode, and outputs the image data to the output unit 19. In addition, the tag information embedding unit 17 includes a tag holding unit 18 that holds the tag information generated by the tag information generating unit 16. In the Super Slow mode, the tag information embedding unit 17 reads and outputs the reduced image data stored in the memory 15 serving as the ring buffer in such a manner that the tag information embedding unit 17 embeds the tag information held by the tag holding unit 18 into the reduced image data and outputs the reduced image data to the output unit 19. Alternatively, if the tag information is embedded into the reduced image data before the reduced image data are stored in the ring buffer, the tag holding unit 18 may be eliminated.

The output unit 19 has two logical channels CH0 and CH1. The output unit 19 outputs the image data or reduced image data in which the tag information is embedded input from the tag information embedding unit 17 to a subsequent image processing device 30 or the like through the logical channel CH0 or CH1 under the control of the control unit 11.

<Example of Detailed Configuration of Tag Information Generating Unit 16>

Figure 4:
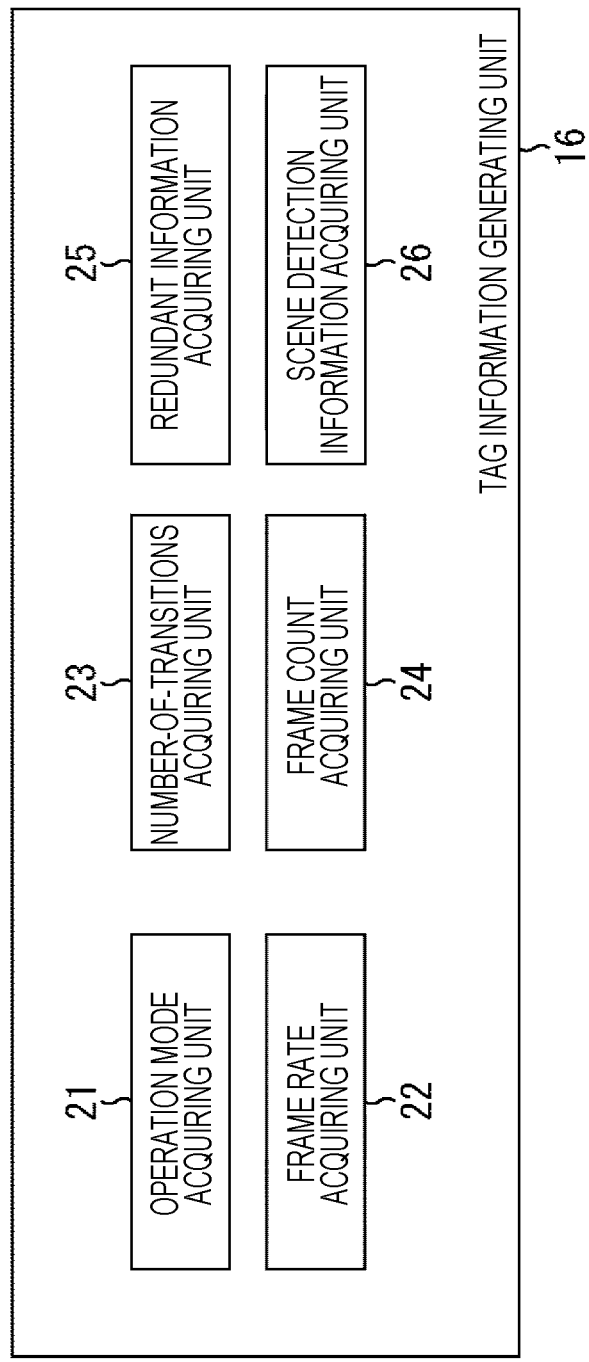
FIG. 4 is a block diagram illustrating an example of a detailed configuration of a tag information generating unit.

Next, FIG. 4 illustrates an example of a detailed configuration of the tag information generating unit 16. The tag information generating unit 16 includes an operation mode acquiring unit 21, a frame rate acquiring unit 22, a number-of-transitions acquiring unit 23, a frame count acquiring unit 24, a redundant information acquiring unit 25, and a scene detection information acquiring unit 26.

The operation mode acquiring unit 21 acquires whether the current operation mode of the image sensor 10 is the Slow Movie mode, the Super Slow mode, or another mode from the control unit 11, and generates SLOW_MODE, which is tag information representing the operation mode. Thus, the tag information SLOW_MODE represents Slow Movie, Super Slow, or Disable (other than Slow Movie and Super Slow).

The frame rate acquiring unit 22 acquires the rate at which the pixel signals are read at the pixel unit 12 from the control unit 11, and generates FRM_RATE_RATIO, which is tag information indicating the frame rate. The tag information FRM_RATE_RATIO is expressed by a multiplying factor with respect to the normal frame rate (assumed to be 30 fps). For example, FRM_RATE_RATIO=6 at the high frame rate (120 fps) in the SLOW Movie mode, while FRM_RATE_RATIO=32 at the still higher frame rate (960 fps) in the Super Slow mode.

The number-of-transitions acquiring unit 23 acquires the number of times the Slow Movie mode is entered in one moving image sequence from the control unit 11, and generates SLOW_NUM, which is tag information indicating the number of transitions. For example, when taking of a moving image is started and the Slow Movie mode is entered, the tag information SLOW_NUM becomes 1. Thereafter, SLOW_NUM remains 1 while taking of a moving image continues after the Slow Movie mode is terminated, and SLOW_NUM is updated with 2 when the Slow Movie mode is entered again. When taking of a moving image is terminated, the tag information SLOW_NUM is returned to 0.

The frame count acquiring unit 24 generates tag information FRM_CNT that counts up one by one at the normal frame rate, and generates tag information FRM_CNT_SS that counts up one by one for each frame having the same FRM_CNT at the still higher frame rate in the Super Slow mode.

The redundant information acquiring unit 25 generates tag information DUPLI_PIC to be embedded into reduced image data thinned and read from the ring buffer and output at the normal frame rate through the logical channel CH0 in a state in which storing of reduced image data into the ring buffer (memory 15) is stopped after a scene is detected in the Super Slow mode.

The scene detection information acquiring unit 26 acquires detection of a preset scene in the Super Slow mode from the scene detection unit 14, and generates tag information SCN_DET indicating whether or not a scene has been detected.

<Imaging Process in Slow Movie Mode>

Figure 5:
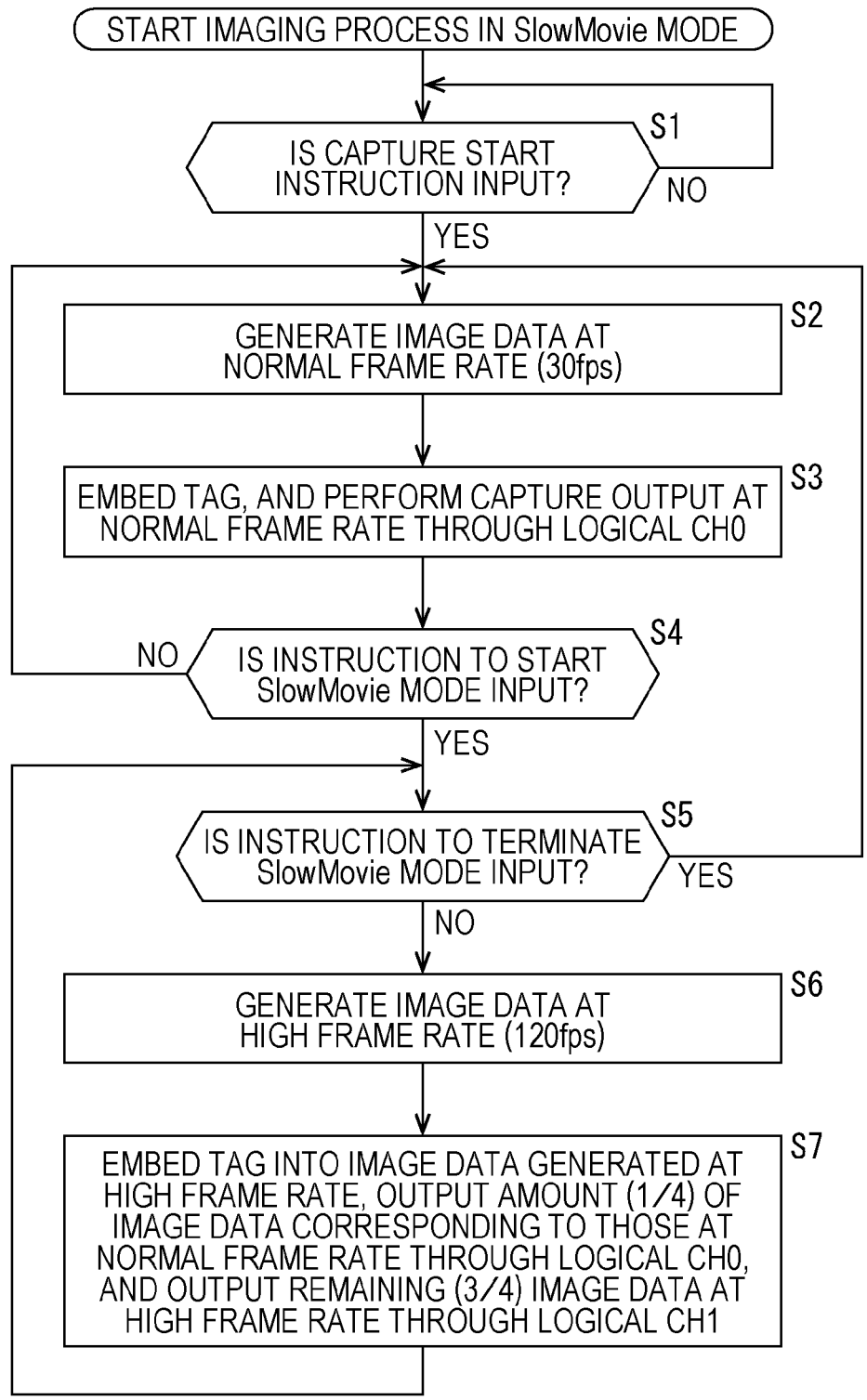
FIG. 5 is a flowchart explaining an imaging process in the Slow Movie mode.

Next, FIG. 5 is a flowchart explaining an imaging process performed by the image sensor 10 in the Slow Movie mode.

Here, it is assumed that the image sensor 10 is already operating in the preview mode, and that image data for preview display are output through the logical channel CH0 of the output unit 19 at the normal frame rate (30 fps, for example).

In step S1, the control unit 11 determines whether or not an instruction to start the capture mode on the assumption that the Slow Movie mode will be entered therefrom is input, and waits until the instruction is input (continue being in the preview mode). When the instruction is input, the process proceeds to step S2.

In step S2, the pixel unit 12 reads pixel signals at the normal frame rate, and the image signal processor 13 generates image data at the normal frame rate on the basis of the read pixel signals. The tag information embedding unit 17 embeds tag information generated by the tag information generating unit 16 into image data of each frame, and outputs the image data to the output unit 19. The output unit 19 outputs the image data having the tag information embedded therein at the normal frame rate through the logical channel CH0.

In step S4, the control unit 11 determines whether or not an instruction to start the Slow Movie mode is input, and if it is determined not to be input, returns the process to step S2 to make the capture mode continue. If the instruction is determined to be input in step S4 thereafter, the process proceeds to step S5. Subsequently, in step S5, the control unit 11 determines whether or not an instruction to terminate the Slow Movie mode is input, and if it is determined not to be input, moves the process to step S6.

In step S6, the pixel unit 12 reads the pixel signals at the high frame rate (120 fps, for example), and the image signal processor 13 generates image data at the high frame rate on the basis of the read pixel signals. In step S7, the tag information embedding unit 17 embeds tag information generated by the tag information generating unit 16 into image data of each frame, and outputs the image data to the output unit 19. The output unit 19 outputs only image data corresponding to those generated at the normal frame rate through the logical channel CH0 among the image data at the high frame rate having the tag information embedded therein, and outputs the remaining image data at the high frame rate through the logical channel CH1.

Specifically, when the normal frame rate 30 fps and the high frame rate is 120 fps, which is four times as large as the normal frame rate, one frame per every four frames of image data at the high frame rate is output at the normal frame rate through the logical channel CH0, and the remaining three frames are output at the high frame rate through the logical channel CH1.

Subsequently, the process is returned to step S5, and subsequent processing is continued. Then, if an instruction to terminate the Slow Movie mode is determined to be input in step S5, the process is returned to step S2, and subsequent processing is repeated. Thereafter, the imaging process in the Slow Movie mode is continued until an instruction to terminate the capture mode is input.

Figure 6:
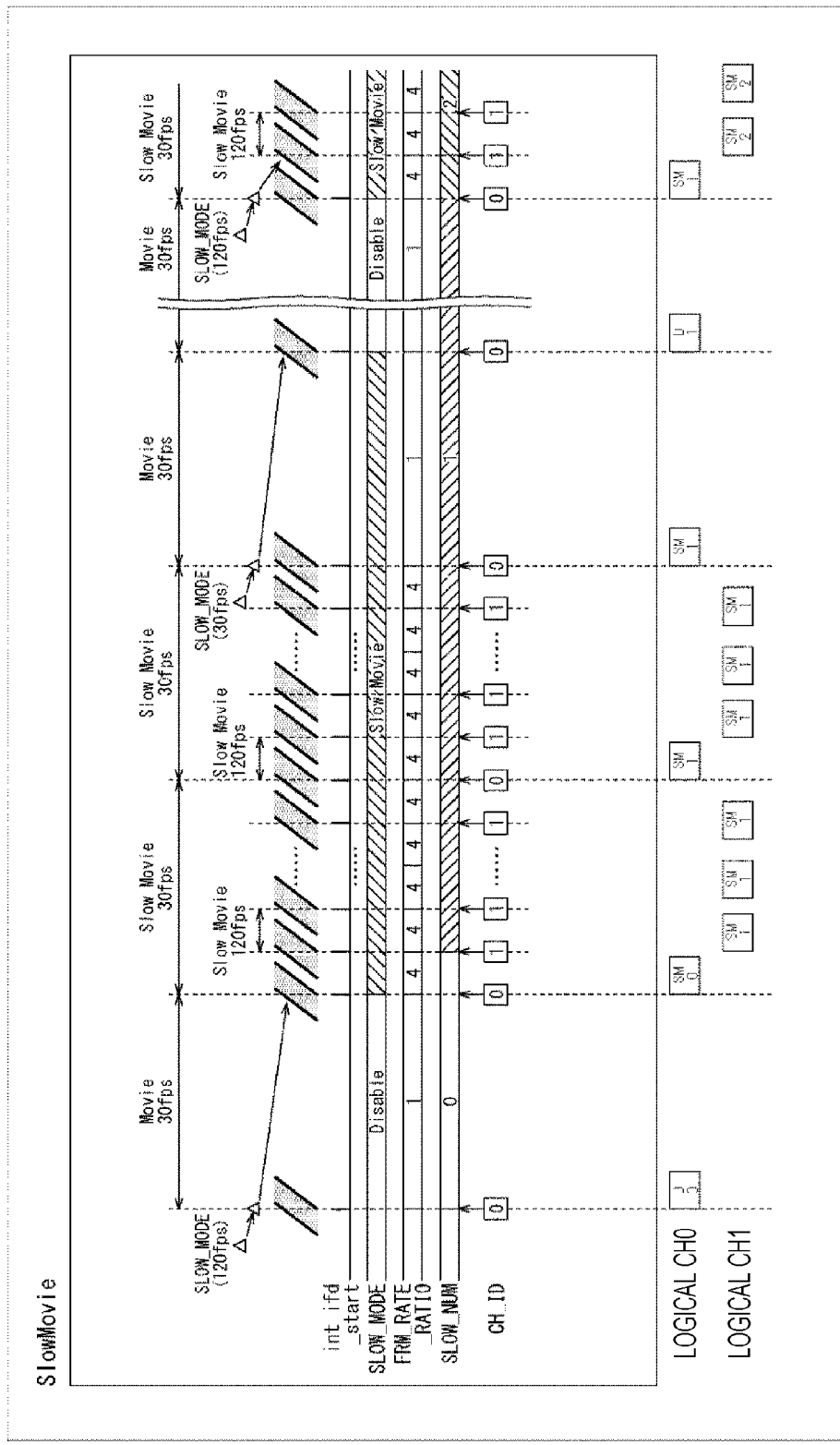
FIG. 6 is a diagram illustrating an example of tag information embedded in the Slow Movie mode.

FIG. 6 illustrates tag information to be embedded into image data output in the imaging process in the Slow Movie mode described above. In respective frames output through the logical channels CH0 and CH1 at a lower part of the figure, D (Disable) and SM (Slow Movie) represent operation modes, and the numbers represent tag information SLOW_NUM.

As illustrated in FIG. 6, basically three types of tag information SLOW_MODE, FRM_RATE_RATIO, and SLOW_NUM may be embedded in the imaging process in the Slow Movie mode.

When the operation mode moves from the Slow Movie mode, however, since image data are output substantially at the same time through the logical channel CH0 and the logical channel CH1 of the output unit 19, the operation mode can be identified without the tag information SLOW_MODE representing the operation mode, and the tag information SLOW_MODE may thus be omitted. Conversely, if the tag information SLOW_MODE representing the operation mode is embedded in the image data, all the image data may be output at the high frame rate through only one of the logical channels CH0 and CH1 without switching between the logical channels to output in the output unit 19.

Note that the tag information may be used as follows at the subsequent image processing device 30 for reconstructing the image data output in the imaging process in the Slow Movie mode in temporal order.

Firstly, attention is focused on the tag information SLOW_NUM(=N) of frames output through the logical channel CH0, so that frames (N=0) where N is incremented are identified.

Subsequently, attention is focused on the tag information SLOW_NUM and FRM_RATE_RATIO of image data output through the logical channel CH1, and the frames having SLOW_NUM=N are inserted after each frame identified at the logical channel CH0, the number of the frames inserted after each frame identified at the logical channel CH0 being associated with FRM_RATE_RATIO.

Thereafter, N is incremented to N=N+1 and the above-described process is repeated, so that the frames output at the normal frame rate through the logical channel CH0 and the frames output at the high frame rate through the logical channel CH1 can be reconstructed in temporal order.

<Imaging Process in Super Slow Mode>

Figure 7:
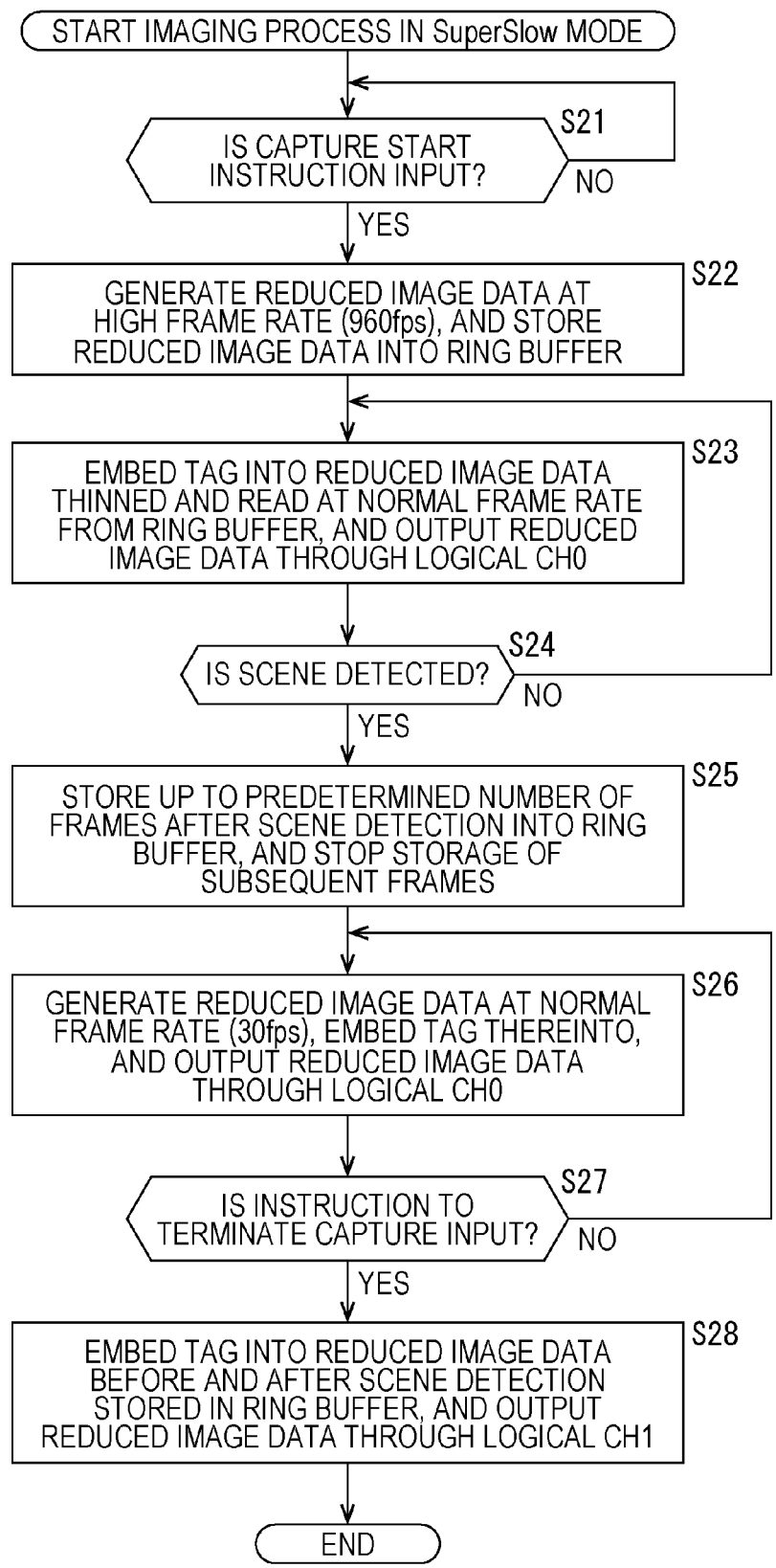
FIG. 7 is a flowchart explaining an imaging process in the Super Slow Movie mode.

Next, FIG. 7 is a flowchart explaining an imaging process performed by the image sensor 10 in the Super Slow mode.

Here, it is assumed that the image sensor 10 is already operating in the preview mode, and that image data for preview display are output through the logical channel CH0 of the output unit 19 at the normal frame rate (30 fps, for example).

In step S21, the control unit 11 determines whether or not an instruction to start the capture mode on the assumption that the Super Slow mode will be entered therefrom is input, and waits until the instruction is input (continue being in the preview mode). When the instruction is input, the process proceeds to step S22.

In step S22, the pixel unit 12 reads the pixel signals at the still higher frame rate (960 fps), and the image signal processor 13 generates reduced image data at the still higher frame rate on the basis of the read pixel signals and stores the reduced image data into the memory 15 serving as the ring buffer. In step S23, the tag information embedding unit 17 thins and reads the reduced image data at the normal frame rate from the ring buffer, embeds tag information thereinto, and outputs the reduced image data to the output unit 19. The output unit 19 outputs the image data having the tag information embedded therein at the normal frame rate through the logical channel CH0.

In step S24, the control unit 11 determines whether or not a preset scene is detected by the scene detection unit 14, returns the process to step S23 and repeats steps S23 and S24 until such a scene is detected. Then, if a preset scene is detected, the process proceeds to step S25.

In step S25, the image signal processor 13 continues generating reduced image data at the still higher frame rate and storing the generated reduced image data into the ring buffer for a predetermined number of frames after the scene detection, and then stop writing into the ring buffer. As a result, the ring buffer holds the predetermined number of frames of the reduced image data at the still higher frame rate after the scene detection.

In step S26, the pixel unit 12 reads pixel signals at the normal frame rate, and the image signal processor 13 generates reduced image data at the normal frame rate on the basis of the read pixel signals. The tag information embedding unit 17 embeds tag information into the reduced image data generated at the normal frame rate, and outputs the reduced image data to the output unit 19. The output unit 19 outputs the reduced image data having the tag information embedded therein at the normal frame rate through the logical channel CH0.

In step S27, the control unit 11 determines whether or not an instruction to terminate the capture mode is input, returns the process to step S26 and repeats steps S26 and S27 until the instruction is input. Then, when the instruction is input, the process proceeds to step S28.

In step S28, the tag information embedding unit 17 reads the reduced image data at a predetermined frame rate from the ring buffer, embeds tag information thereinto, and outputs the reduced image data to the output unit 19. The output unit 19 outputs the image data having the tag information embedded therein at a predetermined frame rate through the logical channel CH1. The imaging process in the Super Slow mode ends here.

Figure 8:
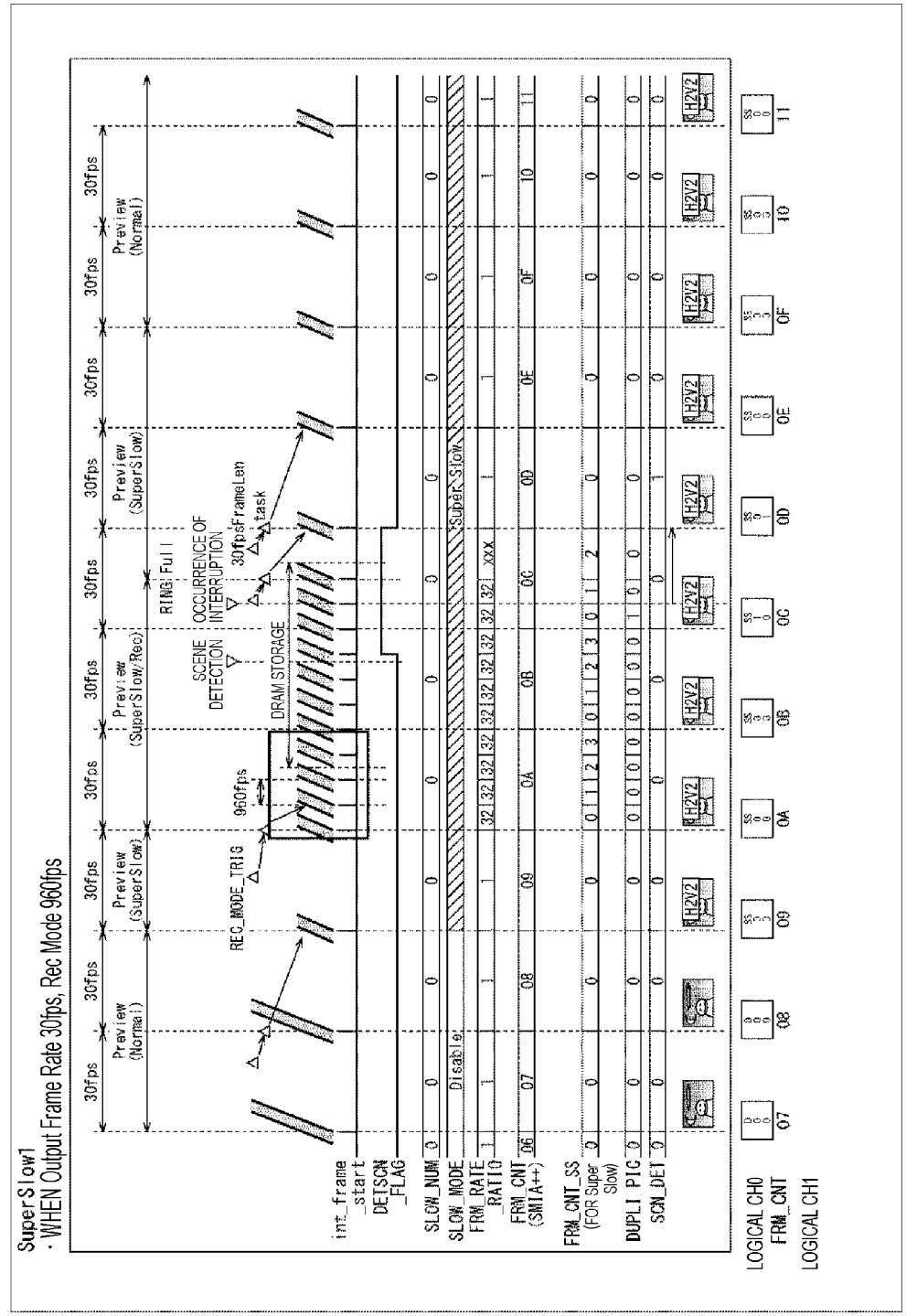
FIG. 8 is a diagram illustrating an example of tag information embedded in the Super Slow Movie mode.

FIG. 8 illustrates tag information to be embedded into image data output in the imaging process in the Super Slow mode described above. Note that, in respective frames output through the logical channels CH0 and CH1 at a lower part of the figure, D (Disable) and SS (Super Slow) represent operation modes, the numbers at the center represent tag information DUPLI_PIC (1 indicates redundancy), the numbers at the bottom represent SCN_DET, and the numbers (hexadecimal numbers) under the respective frames represent FRM_CNT.

As illustrated in FIG. 8, in the imaging process in the Slow Movie mode, basically all the types of tag information SLOW_NUM, SLOW_MODE, FRM_RATE_RATIO, FRM_CNT, FRM_CNT_SS, DUPLI_PIC, and SCN_DET are embedded, among which FRM_RATE_RATIO and DUPLI_PIC are the minimum required. In addition, the tag information FRM_CNT counted up at the normal frame rate is assumed to be embedded in all the frames output through the logical channel CH0 and the logical channel CH1.

The tag information may be used as follows at the subsequent image processing device 30 for reconstructing the image data output in the imaging process in the Super Slow mode in temporal order.

Figure 9:
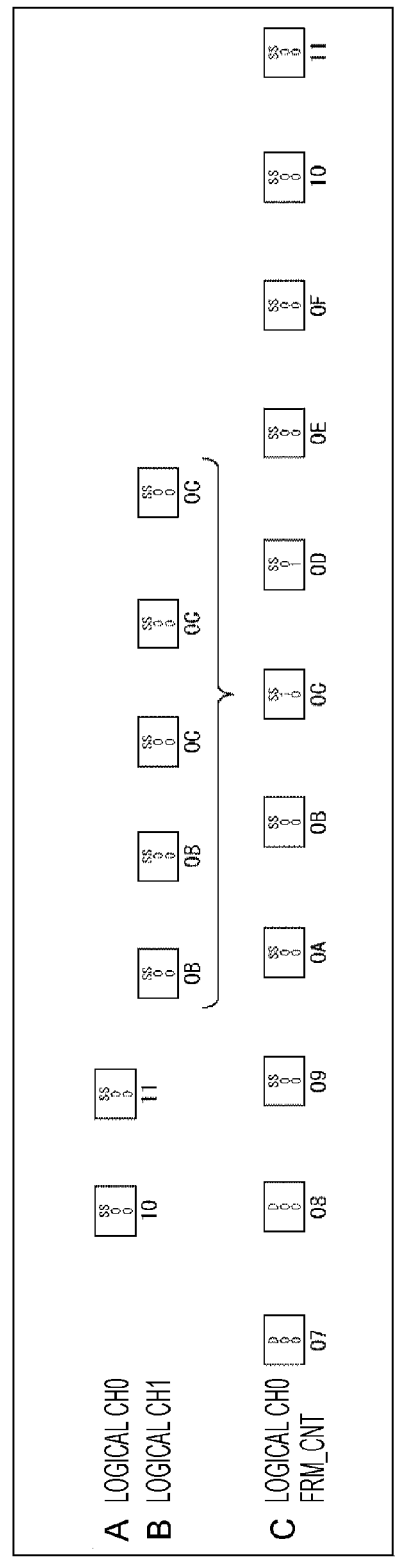
FIG. 9 is a diagram for explaining an arrangement of image data output in the Super Slow Movie mode in temporal order.

FIG. 9 illustrates an example of outputs of the imaging process in the Super Slow mode. Note that A and B in FIG. 9 represent examples of outputs through the logical channels CH0 and CH1, respectively, immediately before the imaging process in the Super Slow mode is terminated, and C in FIG. 9 represents an example of an output through the logical channel CH0 before and after scene detection.

Firstly, attention is focused on the tag information DUPLI_PIC of frames output through the logical channel CH0, and frames DUPLI_PIC=1, that is, the frames also output redundantly through the logical channel CH1 are identified and deleted.

Subsequently, attention is focused on the tag information FRM_RATE_RATIO and FRM_CNT of frames output through the logical channel CH1, and if FRM_RATE_RATIO-1 and the number of frames where the same FRM_CMT are successive are equal to each other, the frames of the same FRM_CNT are deleted among the frames output through the logical channel CH0.

Then, all the frames output through the logical channel CH1 are inserted into the positions of the frames output through the logical channel CH0 and deleted. As a result of the process described above, the frames output at the normal frame rate through the logical channel CH0 and the frames output at a predetermined frame rate through the logical channel CH1 can be reconstructed in temporal order.

<Application of Image Sensor 10>

The image sensor 10 according to the present embodiment described above is applicable to any electronic devices having an imaging function or a sensing function.

Note that embodiments of the present disclosure are not limited to the embodiment described above, but various modifications may be made thereto without departing from the scope of the disclosure.

The present disclosure can also have the following configurations.

(1)

An image sensor including:

a pixel unit configured to generate a pixel signal in response to incident light;

an image generating unit configured to generate image data corresponding to frames of a moving image on the basis of the generated pixel signal;

a tag information generating unit configured to generate tag information to be embedded into the generated image data;

an output unit configured to output the image data having the tag information embedded therein through at least one of first and second logical channels; and a control unit configured to control the pixel unit, the image generating unit, the tag information generating unit, and the output unit to operate in a Slow Movie mode or in a Super Slow Movie mode.

(2)

The image sensor described in (1), wherein the tag information generating unit generates, as the tag information, at least one of SLOW_MODE, FRM_RATE_RATIO, SLOW_NUM, FRM_CNT, FRM_CNT_SS, DUPLI_PIC, and SCN_DET.

(3)

The image sensor described in (1) or (2), wherein in the Slow Movie mode, the control unit outputs the image data having the tag information embedded therein corresponding to a normal frame rate lower than a high frame rate through the first logical channel at the normal frame rate among the image data generated at the high frame rate, and outputs remaining image data having the tag information embedded therein through the second logical channel at the high frame rate.

(4)

The image sensor described in any one of (1) to (3), wherein in the Slow Movie mode, the tag information generating unit generates, as the tag information, at least FRM_RATE_RATIO and SLOW_NUM.

(5)

The image sensor described in any one of (1) to (4), further including a ring buffer to store the generated image data.

(6)

The image sensor described in (5), wherein
in the Super Slow Movie mode, the control unit
stores image data generated at a high frame rate into the ring buffer, outputs the image data read at a normal frame rate lower than the high frame rate from the ring buffer at the normal frame rate through the first logical channel in a state in which the tag information is embedded in the image data, stops storage of the image data generated at the high frame rate into the ring buffer in response to detection of a predetermined scene, outputs the image data generated at the normal frame rate and having the tag information embedded therein at the normal frame rate through the first logical channel in a state in which storage into the ring buffer is stopped, and after the output through the first logical channel is terminated, reads the image data generated at the high frame rate and stored in the ring buffer at a predetermined frame rate and outputs the read image data through the second logical channel in a state in which the tag information is embedded therein.

(7)

The image sensor described in any one of (1) to (6), wherein in the Super Slow Movie mode, the tag information generating unit generates, as the tag information, at least FRM_RATE_RATIO and DUPLI_PIC.

(8)

An electronic device including an image sensor mounted thereon, the image sensor including:

a pixel unit configured to generate a pixel signal in response to incident light;

an image generating unit configured to generate image data corresponding to frames of a moving image on the basis of the generated pixel signal;

a tag information generating unit configured to generate tag information to be embedded into the generated image data;

an output unit configured to output the image data having the tag information embedded therein through at least one of first and second logical channels; and a control unit configured to control the pixel unit, the image generating unit, the tag information generating unit, and the output unit to operate in a Slow Movie mode or in a Super Slow Movie mode.

REFERENCE SIGNS LIST

10 Image sensor
11 Control unit
12 Pixel unit
13 Image signal processor
14 Scene detection unit
15 Memory (ring buffer)
16 Tag information generating unit
17 Tag information embedding unit
18 Tag holding unit
19 Output unit
21 Operation mode acquiring unit
22 Frame rate acquiring unit
23 Number-of-transitions acquiring unit
24 Frame count acquiring unit
25 Redundant information acquiring unit
26 Scene detection information acquiring unit

The invention claimed is:

1. An image sensor, comprising:
at least one photodetector configured to generate a pixel signal based on incident light; and
one or more processors configured to:
generate image data corresponding to a plurality of frames of a moving image based on the generated pixel signal;
generate tag information that is embedded into the generated image data;
determine a frame rate for each of the plurality of frames of the moving image;
control to output the image data, having the embedded tag information, via at least one of a first logical channel or a second logical channel based on the determined frame rate for each of the plurality of frames of the moving image; and
control the image sensor to operate in one of a Slow Movie mode or in a Super Slow Movie mode.

2. The image sensor according to claim 1,
wherein the one or more processors are further configured to generate, as the tag information, at least one of "SLOW_MODE", "FRM_RATE_RATIO", "SLOW_NUM", "FRM_CNT", "FRM_CNT_SS", "DUPLI_PIC", or "SCN_DET".

3. The image sensor according to claim 2,
wherein in the Slow Movie mode, the one or more processors are further configured to:
control to output first image data, among the image data generated at a second frame rate, via the first logical channel at a first frame rate, wherein the first image data comprises the tag information corresponding to the first frame rate,
wherein the first frame rate is lower than the second frame rate; and
control to output second image data at the second frame rate via the second logical channel, wherein the second image data is other than the first image data among the image data generated at the second frame rate, wherein the second image data comprises the tag information corresponding to the second frame rate.

4. The image sensor according to claim 3,
wherein in the Slow Movie mode, the one or more processors are further configured to generate, as the tag information, at least one of "FRM_RATE_RATIO" or "SLOW_NUM".

5. The image sensor according to claim 2, further comprising a ring buffer configured to store the generated image data.

6. The image sensor according to claim 5, wherein in the Super Slow Movie mode, the one or more processors are further configured to:
store first image data generated at a first frame rate into the ring buffer;
based on the tag information that is embedded in the first image data, control to output the first image data, read at a second frame rate from the ring buffer, via the first logical channel at the second frame rate,
wherein the second frame rate is lower than the first frame rate;
stop storage of the first image data, generated at the first frame rate, into the ring buffer based on detection of a determined scene;
based on a termination of the storage of the first image data into the ring buffer, control to output second image data, generated at the second frame rate and comprises the tag information corresponding to the second frame rate, via the first logical channel at the second frame rate; and
based on a termination of an output via the first logical channel and based on the tag information that is embedded in the first image data:
read the first image data, wherein the first image data is generated at the first frame rate and stored in the ring buffer at a third frame rate; and
control to output the first image data via the second logical channel at the third frame rate.

7. The image sensor according to claim 6,
wherein in the Super Slow Movie mode, the one or more processors are further configured to generate, as the tag information, at least one of "FRM_RATE_RATIO" or "DUPLI_PIC".

8. An electronic device comprising:
an image sensor, wherein the image sensor comprises:
at least one photodetector configured to generate a pixel signal based on incident light; and
one or more processors configured to:
generate image data corresponding to a plurality of frames of a moving image based on the generated pixel signal;
generate tag information that is embedded into the generated image data;
determine a frame rate for each of the plurality of frames of the moving image;
control to output the image data, having the embedded tag information, via at least one of a first logical channel or a second logical channel based on the determined frame rate for each of the plurality of frames of the moving image;
control the image sensor to operate in one of a Slow Movie mode or in a Super Slow Movie mode.

* * * * *